(12) United States Patent
Zimmerman et al.

(10) Patent No.: US 6,414,828 B1
(45) Date of Patent: Jul. 2, 2002

(54) LASER VENTILATION SYSTEM

(75) Inventors: Kay Zimmerman; Ulrich Rebhan, both of Göttingen (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/482,182

(22) Filed: Jan. 12, 2000

Related U.S. Application Data

(60) Provisional application No. 60/124,806, filed on Mar. 17, 1999.

(51) Int. Cl.[7] .................................................. H02H 3/00
(52) U.S. Cl. ............................ 361/1; 361/692; 361/695
(58) Field of Search .............................. 361/1, 78, 103, 361/688, 704, 714, 694–695; 372/34, 38, 58

(56) References Cited

U.S. PATENT DOCUMENTS

| | | | | |
|---|---|---|---|---|
| 4,573,159 A | * | 2/1986 | Aagano et al. ............... | 372/34 |
| 4,823,349 A | * | 4/1989 | Koop et al. .................. | 372/34 |
| 4,956,846 A | * | 9/1990 | Iehisa ......................... | 372/58 |
| 5,084,885 A | * | 1/1992 | Iehisa et al. ................. | 372/34 |
| 5,669,813 A | * | 9/1997 | Jairazbhoy et al. .......... | 454/69 |
| 5,748,656 A | * | 5/1998 | Watson et al. ............... | 372/35 |
| 6,021,150 A |   | 2/2000 | Partio et al. ................. | 372/57 |

\* cited by examiner

*Primary Examiner*—Ronald W. Leja
(74) *Attorney, Agent, or Firm*—Sierra Patent Group, Ltd.; Andrew V. Smith

(57) ABSTRACT

A ventilation system for industrial laser systems is disclosed which can minimize the cooling air intake required during normal operation. Adequate ventilation is maintained even if the housing is opened. Various sensors monitor the condition of the cooling air and can increase the air intake if required for cooling or safety. Such a ventilation system is of particular advantage for excimer lasers in microlithography applications because the consumption of conditioned clean room air is controlled by the actual needs of the laser device.

33 Claims, 3 Drawing Sheets

LASER VENTILATION SYSTEM

CROSS-REFERENCE TO RELATED APPLICATION

This application claims the benefit of the Mar. 17, 1999 filing date of provisional application No. 60/124,806, which is incorporated herein by reference.

BACKGROUND OF THE INVENTION

This invention relates generally to providing improved ventilation for industrial machines, particularly for industrial lasers.

Industrial laser systems are normally enclosed in a protective housing. In the case of excimer lasers used in industrial applications (and more specifically in photolithographic applications), the protective housing has several functions, including: protection against laser radiation; protection against high voltage components; protection against ozone produced by 193 nm. laser radiation; protection against toxic gases released in case of a leak; air cooling of sub modules and electromagnetic shielding.

The cooling air might contain toxic gases, such as fluorine released by small leaks or ozone produced by high voltage components or deep UV laser radiation. Housing panels and doors are normally sealed with rubber or silicon rubber gaskets. The housing and the exhaust fan are designed in such a way that the laser housing may be operated under negative pressure compared to ambient pressure. This means that for a well designed system, ambient air will enter the laser housing through designed air inlets, but the air enclosed by the housing will not return through the air intakes, small gaps and slots into the environment. The exhaust air flow might contain toxic gases, therefore the exhaust of the laser housing should be connected to an industrial ventilation system. Well-designed systems fulfill the industrial safety standards.

Industrial excimer laser systems are typically adjusted during maintenance or service. During maintenance or service, access panels or doors must be opened, which breaks the protective enclosure. Therefore, it is difficult to maintain the desired negative pressure within the laser housing during maintenance or service.

Moreover, conventional ventilation systems do not make the most efficient use of cooling air. This can be a problem when a laser system is used in a clean room environment, because the cost of providing clean room air can be significant.

There are three state-of-the-art approaches to maintaining ventilation safety. The first approach was used in industrial lasers which were manufactured by Lambda Physik beginning in 1988. The laser housing was divided into several smaller compartments. Each compartment was separately ventilated, i.e., each compartment had its own exhaust blower and exhaust duct. Opening a single panel broke the protective enclosure of a single compartment, but the other compartments were still at negative pressure and safe ventilation conditions. Larger laser systems had up to three exhaust ducts. Installation of such systems was cumbersome for industrial users. The amount of exhausted air was quite high, which created problems when a laser was installed in a clean room.

The second approach was followed by a later version of the Lambda industrial laser series. One strong exhaust blower was installed. The location of all air intakes, internal baffles and vanes were designed in such a manner that a sufficient gas flow was provided at all areas where a leak might occur or ozone might be generated. The combination of vanes, baffles, properly located air intakes and a strong exhaust blower could maintain safe ventilation conditions even when the protective housing was opened at one location. The main disadvantage of this design was the large air exhaust rate.

A third solution Is described in U.S. Pat. No. 5,748,656, which teaches that clear plastic panels or curtains are located behind the access doors. Rubber flaps can be used over access holes in the clear plastic panels. These rubber flaps permit a service engineer to reach into the ventilated enclosure without substantial loss of ventilation. Major disadvantages of these panels, curtains and rubber flaps are the restricted access for the service engineers and the risk of flammability. Like the other designs, this design has a high air exhaust rate.

SUMMARY OF THE INVENTION

It is an object of the present invention to provide a ventilation system for industrial lasers which provides adequate cooling while using a minimum of cooling gas.

It is a further object of the present invention to provide a ventilation system for industrial lasers which provides adequate ventilation even when the housing of the laser device is open.

It is a feature of the present invention to provide a laser device with one or more sensors.

It is another feature of the present invention to provide a laser device which can automatically perform safety countermeasures.

It is an advantage of the present invention to reduce the cost of operating a laser device.

It is a further advantage of the present invention to increase the safety of workers who are operating, maintaining or servicing laser devices.

An improved ventilation system consists of an exhaust channel, at least one exhaust port, at least one air inlet and at least one blower. The exhaust channel is in fluid communication with internal compartments of a laser housing which require cooling and allows sufficient ventilation of all such compartments.

In a preferred embodiment, blowers with adjustable speed are used to circulate cooling gas. During normal operation the blowers are running at low speed. The amount of cooling gas can be minimized in this way. This is of special advantage if the laser device is installed in a clean room, because the conditioned clean room air is very expensive.

Various sensors can be installed in the device in order to monitor properties such as temperature or the concentrations of halogen, ozone, smoke, etc. Depending on the sensor outputs, the air flow rate can be adjusted automatically in order to maintain optimum ventilation conditions with minimum cooling air consumption. Sensor outputs can also be used to trigger safety countermeasures.

Sufficient ventilation conditions can be maintained even if the housing of the laser device is opened for service or maintenance. In some embodiments, individual blowers are used for different compartments, so even if the blower at one location is not active during service or maintenance, the other blowers create adequate ventilation. For embodiments which use a single blower, ventilation safety can be maintained during maintenance or service by increasing the blower speed.

BRIEF DESCRIPTION OF THE DRAWINGS

FIG. 3.b) illustrates a ventilation system with a door temporarily opened, according to a second embodiment of the presently-claimed invention.

DETAILED DESCRIPTION OF THE PREFERRED EMBODIMENTS

Figure 1:
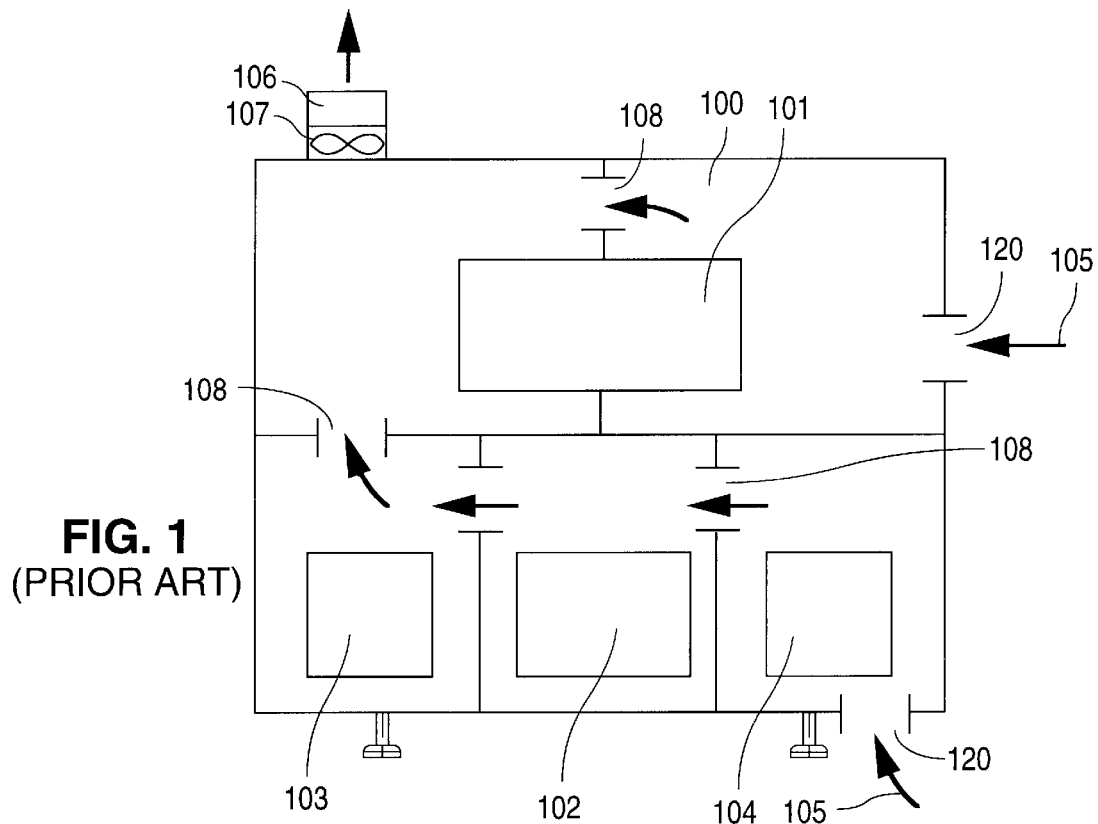
FIG. 1 illustrates a conventional ventilation system.

The laser housing 100 shown in FIG. 1 encloses all major laser components, such as laser discharge unit 101, high voltage power supply 102, gas and cooling water utilities 103, electrical utilities and electronic control modules 104. The housing typically has several air inlets 120, which take in air at flow rates 105, and at least one air outlet 106. The laser Is normally equipped with an exhaust blower 107. The exhaust flow rate is typically on the order of 200 m³/hour. Air is guided by internal vanes and baffle plates 108 in order to cool heat-generating components efficiently.

First Embodiment of the Present Invention

Figure 2:
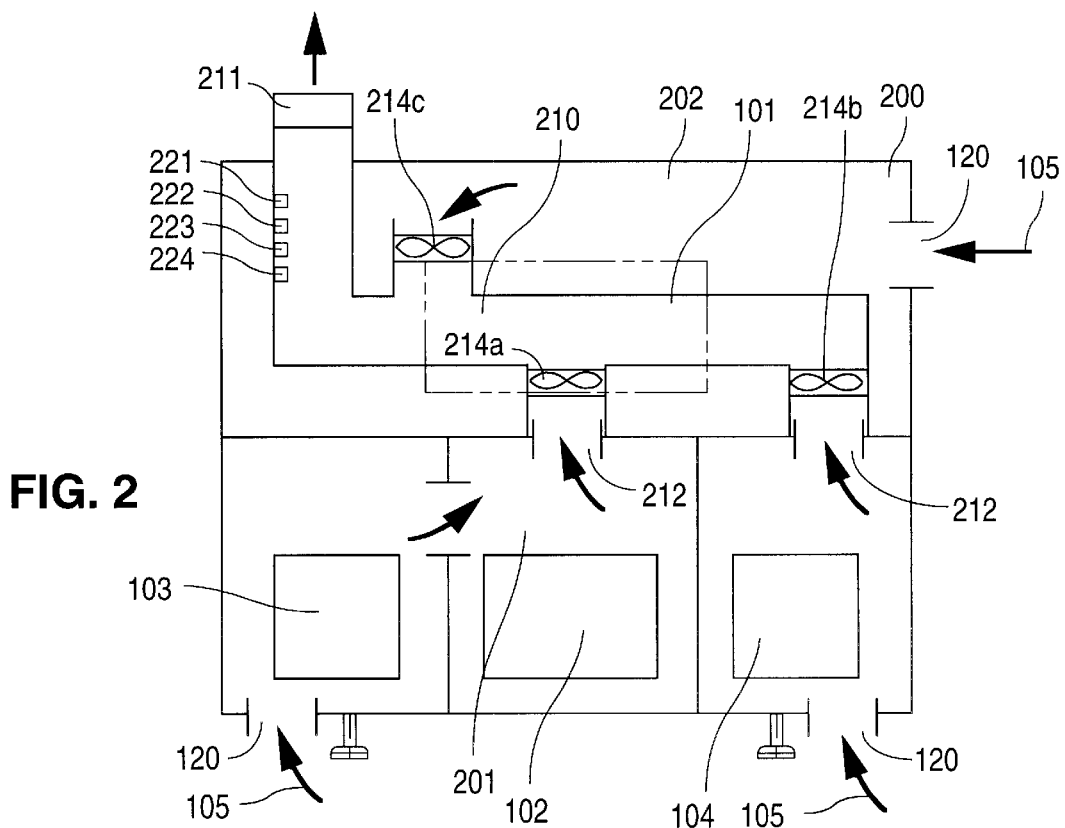
FIG. 2 illustrates a ventilation system according to a first embodiment of the presently-claimed invention.

The following description refers to elements illustrated in FIG. 2. The housing of the laser device 200 is equipped with an exhaust channel 210. The laser housing is divided into several compartments. Exhaust channel 210 is designed in such a way that cabinet compartments can be individually connected to this channel. The channel has at least one exhaust port 211 located outside of the laser housing and at least one intake port 212 located inside of the laser housing.

In a first embodiment, blowers 214a, 214b and 214c are installed at or near intake ports 212 of exhaust channel 210. Blowers 214a and 214b provide sufficient ventilation for lower laser compartment 201, while blower 214c provides ventilation for upper laser compartment 202.

Because individual blowers are used for different compartments, sufficient ventilation conditions can be maintained even if the housing of the laser device is opened for service or maintenance at one location.

Sensors

For reasons of safety and efficiency, various detectors or sensors can be installed inside exhaust channel 210, inside a compartment or in any convenient location. Sensors can be configured to generate various types of sensor signals to a processor, which can be part of the laser device or located elsewhere and connected to the device via a network. The processor could generate signals to control, e.g., blower speed or otherwise to respond to conditions detected by the sensor.

For example, an air flow sensor 221 can be installed in order to monitor the flow rate. In case of insufficient air flow 220, this sensor will send a signal to a processor which will signal an alarm to sound. Depending on the severity of the detected conditions, the processor could transmit signals which cause laser operation to be terminated. Insufficient air flow might affect performance of internal air cooled laser modules and removal of traces of toxic gases like halogen or ozone.

A halogen leak sensor 222 can be installed in order to monitor the halogen concentration in the exhaust air. In case of a gas leak this sensor will transmit a corresponding signal to the processor, which will generate signals causing a halogen alarm to sound, causing laser operation to be terminated within a short time period and causing all internal gas valves to be immediately closed. Additionally, a signal could be generated to close all valves in the facility gas supply system.

A temperature sensitive sensor 223 can be installed in order to monitor the temperature of the exhausted cooling air. In addition, a smoke or fire detection system 224 can be installed within exhaust channel 210.

A differential pressure sensor 225 can be installed within the laser device. Such a sensor measures the air pressure inside of the laser housing in comparison to the ambient air pressure. When the differential air pressure falls below a preset level, an alarm will be activated and, if possible, ventilation is increased.

Exhaust channel 210 is a preferred location for installation of sensors. For example one halogen leak sensor is sufficient to monitor or control all internal laser compartments at one time.

In prior art ventilation systems, the installation conditions recommended by the sensor manufacturers were sometimes difficult to fulfill. For example, some sensors require a more or less laminar air flow to function properly. Laminar flow can easily be achieved inside a straight section of exhaust channel 210.

Sets of sensors can be installed near the air intakes of exhaust channel 210 in order to monitor the status in different laser compartments. For example, installation of differential pressure sensors in each compartment can be advantageous. These sensors allow identification of compartments with insufficient ventilation and facilitate the initiation of adequate countermeasures.

Second Embodiment of the Present Invention

Figure 3A:
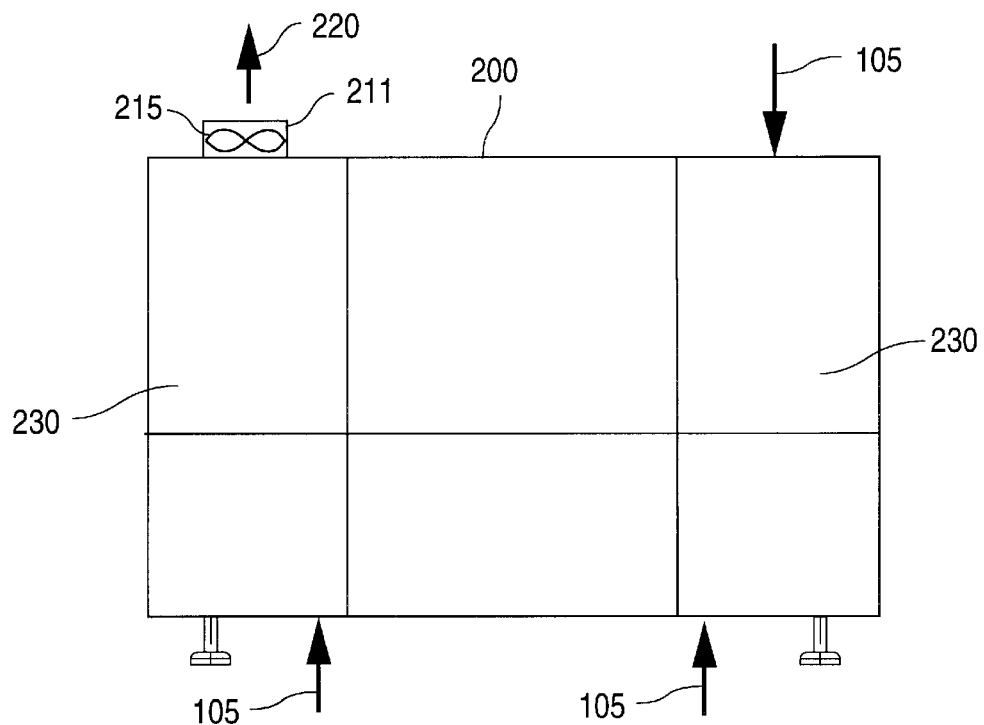
FIG. 3.a) illustrates a ventilation system according to a second embodiment of the presently-claimed invention.
Figure 3B:
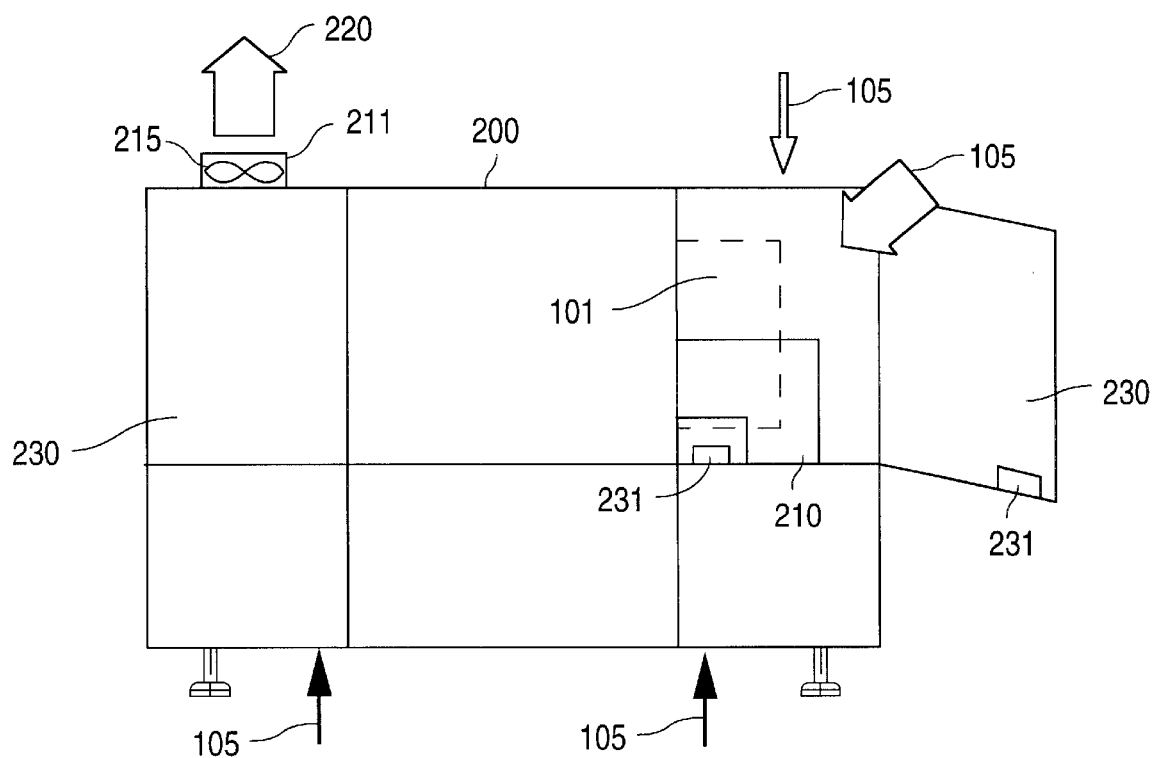

The following description refers to elements illustrated in FIGS. 3.a) and 3.b). In a second embodiment, a single blower 215 is installed at or near the exit port 211 of exhaust channel 210. The size of the air intake ports 212 depends on the ventilation requirements of the connected compartments. In a preferred embodiment, the air flow rate 220 within exhaust channel 210 can be adjusted by the blower speed. Blower 215 may be two-speed, multiple-speed or continuously adjustable.

FIG. 3.a) shows the laser device during normal operation. The blower 215 is running at low speed. The air intake rate (arrows 105) and the air exhaust rate (arrow 220) are low. This is indicated by the small arrows. Low speed ventilation is sufficient for laser stand-by and laser operation under normal conditions. Low speed ventilation Is a major advantage if the laser is installed in a clean room, because the conditioned clean room air is expensive and its consumption can be minimized in this way.

In case of high ambient air temperature, the air temperature in exhaust channel 210 will increase. Air temperature sensor 223 (FIG. 2) can be used to cause an increased flow rate 220 and to cause sufficient cooling to be provided even with poor ambient conditions. In case of a halogen leak, the halogen sensor 222 (FIG. 2) can generate a signal to the processor which will cause an alarm to sound, cause all internal valves to be shut off and cause the exhaust flow rate to be increased to its maximum level. This procedure minimizes risk without wasting expensive conditioned air during normal operations.

In case of service or maintenance activities, a panel or a door 230 of the laser enclosure must be opened. Opening the housing affects the ventilation conditions of the laser device.

However, the present invention allows negative pressure to be maintained in all compartments except the one which is open. For example, the housing panels and doors can be interlocked. Activated interlock switch 231, another type of sensor, transmits a signal to the processor or laser controller indicating which door is opened. This information can be used to increase the blower speed to maximum (or otherwise increase the flow rate, as explained below in the description of the third embodiment) during maintenance or service.

FIG. 3.*b*) shows the laser device during service or maintenance, with door 230 opened. The interlock switch 231 has triggered the blower 215 to run at high speed. This causes low air intake rates 105 into the closed lower compartments and a high air intake rate 105 into the opened upper compartment, as indicated by the enlarged arrow 105. This procedure allows ventilation safety to be maintained during maintenance and service actions. Instead of monitoring the door interlock status, the signal from one ore more differential pressure sensors, preferably located in each compartment which may be opened, can be used provide a signal which indicates when the flow rate should be increased.

Third Embodiment of the Present Invention

Figure 4:
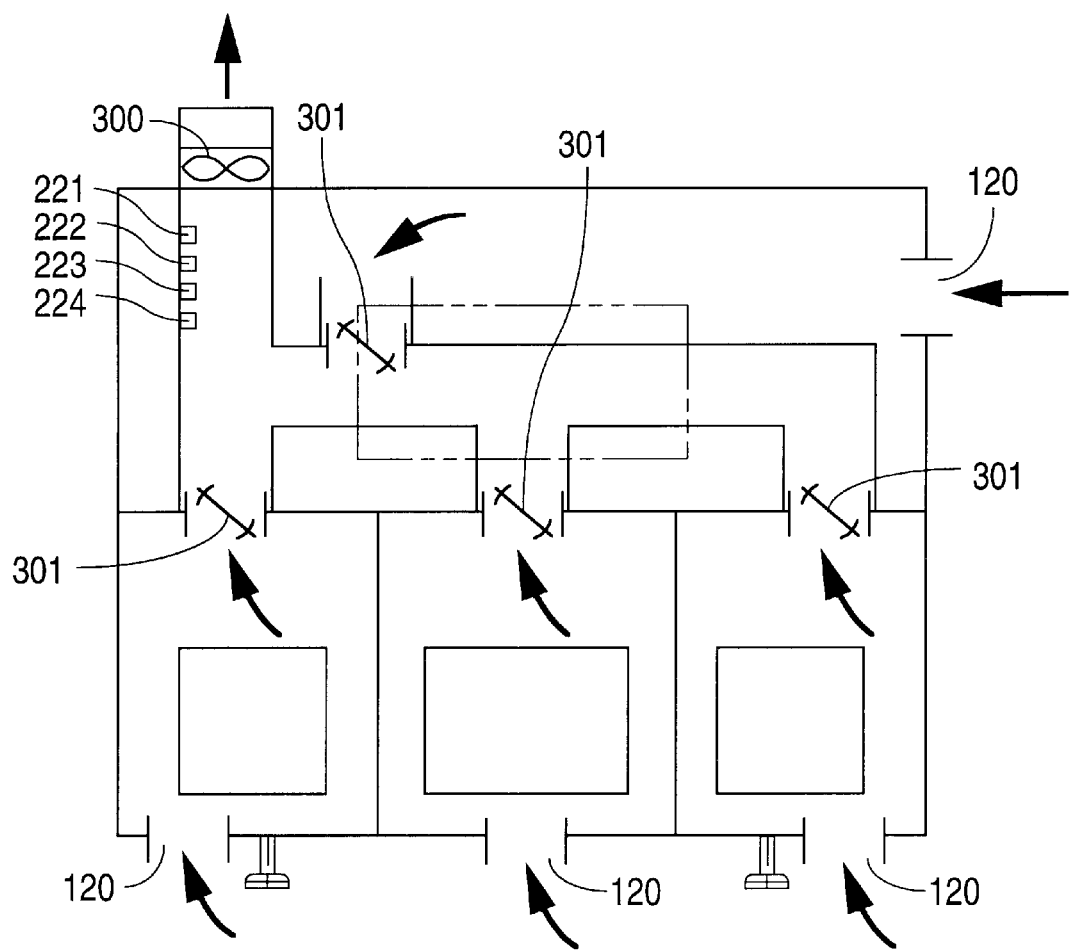
FIG. 4 illustrates a ventilation system according to a third embodiment of the presently-claimed invention.

The following description refers to elements illustrated in FIG. 4. In a third embodiment, exhaust channel 210 is equipped with a blower 300 continuously running at a single speed.

The air flow rate extracted from each compartment can be adjusted by aperture controls, such as throttle valves 301, located at the air intakes of exhaust channel 210. The position of the throttle valves can be controlled by signals from a processor in response to input from sensors, e.g., from air pressure sensors located at the air intakes to exhaust channel 210 or from interlock switches monitoring the status of laser housing doors and panels. Other types of aperture controls, such as butterfly valves or flaps, may be used instead of throttle valves.

Fourth Embodiment of the Present Invention

The following description refers to modified versions of elements shown in FIG. 2. A properly designed exhaust channel has the air intake ports 212 close to internal components which generate heat. This allows the removal of heated cooling air Immediately from the laser system without heating of other laser components. On the other hand, a well-designed exhaust channel avoids undesirable cooling of temperature sensitive parts with cold ambient air. Controlled removal of heat and controlled cooling air intake are preconditions for efficient temperature stabilization of laser components or entire laser compartments.

Temperature stabilization of laser components or compartments can be supported by additional heating elements. Temperature stabilization is of special importance for a line narrowed excimer laser because the laser resonator and the optical components are sensitive to temperature changes.

For example, the inlets 120 to the laser housing, internal vanes and baffle plates 108, and the intakes 212 to exhaust channel 210 may be located in such a way that the temperature sensitive optical components for beam diagnostics are not affected by cold ambient air. The heat generated by the powerful gas circulation motor and the laser tube are removed from the system without heating the optical resonator system.

Although only certain embodiments have been described in detail, those having ordinary skill in the art will understand that many modifications are possible without departing from the teachings thereof. All such modifications are intended to be encompassed within the following claims.

We claim:

1. A ventilation system for a laser device, comprising:
    a housing which encloses a plurality of compartments and includes a plurality of air inlets;
    an exhaust channel defined within the housing for receiving exhaust from the plurality of compartments;
    a plurality of intake ports, each of which is positioned between a compartment and the exhaust channel;
    a plurality of blowers, each of which is proximate to an intake port, which force exhaust to flow from the plurality of compartments to the exhaust channel; and
    at least one exhaust port for expelling exhaust from the exhaust channel, wherein the number of exhaust ports is less than the number of intake ports.

2. The ventilation system of claim 1, further comprising at least one sensor for monitoring a condition of the laser device.

3. The ventilation system of claim 1, wherein there is a single exhaust port.

4. The ventilation system of claim 2, wherein the condition is selected from the group consisting of exhaust flow speed, temperature, halogen concentration, ozone concentration, smoke concentration, pressure, differential pressure and whether a compartment is open.

5. The ventilation system of claim 2, wherein the sensor has a location selected from the group consisting of the following locations: inside a compartment, inside the exhaust channel, near an air inlet and near an intake port.

6. A ventilation system for a laser device, comprising:
    a housing which encloses a plurality of compartments and includes a plurality of air inlets;
    an exhaust channel defined within the housing for receiving exhaust from the plurality of compartments;
    a plurality of intake ports, each of which is positioned between a compartment and the exhaust channel;
    an exhaust port for conducting exhaust from the exhaust channel;
    a blower proximate to the exhaust port which forces exhaust to flow through the exhaust channel to the exhaust port and which operates at varying blower speeds, according to a blower speed signal;
    at least one sensor located within the housing for detecting at least one condition of the laser device and for generating sensor signals corresponding to the condition detected; and
    a processor for receiving the sensor signals, for determining blower speeds according to the sensor signals, for generating blower speed signals corresponding to the determined blower speeds, and for transmitting the blower speed signals to the blower.

7. The ventilation system of claim 6, wherein:
    the at least one sensor detects whether a compartment is open or closed and generates a corresponding sensor signal; and
    when the sensor signal indicates that a compartment is open, the processor transmits a blower speed signal which causes the blower to increase the blower speed.

8. The ventilation system of claim 6, wherein the at least one condition is selected from the group consisting of exhaust flow speed, temperature, halogen concentration, ozone concentration, smoke concentration, pressure, differential pressure and whether a compartment is open.

9. The ventilation system of claim 6, wherein the location of the at least one sensor is selected from the group consisting of the following locations: inside a compartment, inside the exhaust channel, near an air inlet and near an intake port.

10. The ventilation system of claim 6, wherein when the processor receives a sensor signal which indicates an abnormal condition has been detected by a sensor, the processor determines that the blower speed should be increased and generates a blower speed signal indicating that the blower speed should be increased.

11. A ventilation system for a laser device, comprising:
   a housing which encloses a plurality of compartments and includes a plurality of air inlets;
   an exhaust channel defined within the housing for receiving exhaust from the plurality of compartments;
   a plurality of intake ports, each of which is positioned between a compartment and the exhaust channel;
   an aperture control which allows exhaust to flow from an intake port through the exhaust channel at varying flow rates, according to flow rate signals;
   an exhaust port for conducting exhaust from the exhaust channel;
   a blower proximate to the exhaust port which forces exhaust to flow from the exhaust channel through the exhaust port;
   at least one sensor located within the housing for detecting at least one condition of the laser device and for generating sensor signals in response thereto; and
   a processor for receiving the sensor signals, for determining flow rates according to the sensor signals, for generating flow rate signals according to the determined flow rates and for transmitting the flow rate signals to the aperture control.

12. The ventilation system of claim 11, wherein:
   the at least one sensor detects whether a compartment is open or closed and generates a corresponding sensor signal; and
   when the sensor signal indicates that a compartment is open, the processor generates and transmits a blower speed signal which causes the blower to increase the blower speed.

13. The ventilation system of claim 11, wherein the at least one condition is selected from the group consisting of exhaust flow speed, temperature, halogen concentration, ozone concentration, smoke concentration, pressure, differential pressure and whether a compartment is open.

14. The ventilation system of claim 11, wherein the location of the at least one sensor is selected from the group consisting of the following locations: inside a compartment, inside the exhaust channel, near an air inlet and near an intake port.

15. The ventilation system of claim 11, wherein the aperture control consists of an apparatus selected from the group consisting of a throttle valve, a butterfly valve, a flap, a baffle and a vane.

16. The ventilation system of claim 11, wherein when the processor receives a sensor signal which indicates an abnormal condition has been detected by a sensor, the processor determines that the blower speed should be increased and generates a blower speed signal indicating that the blower speed should be increased.

17. The ventilation system of claim 1, 6 or 11, wherein:
   the laser device comprises a component which generates heat; and
   an air inlet is located near the component which generates heat.

18. The ventilation system of claim 1, 6 or 11, wherein the laser device further comprises at least one temperature-sensitive component; and
   wherein the ventilation system further comprises temperature stabilization means for stabilizing the temperature of the temperature-sensitive component.

19. The ventilation system of claim 1, 6 or 11, wherein the laser device further comprises at least one temperature-sensitive component and at least one heat-generating component; and wherein
   the ventilation system removes heat generated by a heat-generating component without affecting the temperature of a temperature-sensitive component.

20. The ventilation system of claim 6 or 11, further comprising countermeasure means for initiating countermeasures based on a countermeasure signal generated by the processor.

21. The ventilation system of claim 18, wherein the temperature stabilization means comprises an element selected from the group consisting of a temperature sensor, a heating element, a baffle, a vane and a blower.

22. The ventilation system of claim 20, wherein the countermeasure means comprises an element selected from the group consisting of an alarm, a control for terminating a laser operation, a valve for shutting off a gas supply, a flow rate signal which indicates an increase in flow rate and a blower speed signal which indicates an increase in blower speed.

23. A ventilation system for a laser device, comprising:
   a housing of the laser system which encloses a plurality of compartments and includes at least one air inlet;
   an exhaust channel defined within the housing for receiving exhaust from the plurality of compartments;
   a plurality of intake ports each of which is positioned downstream of at least one compartment and upstream of the exhaust channel;
   a blower for forcing exhaust to flow from the plurality of compartments to the exhaust channel; and
   an exhaust port for expelling exhaust from the exhaust channel.

24. The ventilation system of claim 23, further comprising at least one sensor for monitoring a condition of the laser device.

25. The ventilation system of claim 24, wherein the condition is selected from the group consisting of exhaust flow speed, temperature, halogen concentration, ozone concentration, smoke concentration, pressure, differential pressure and whether a compartment is open.

26. The ventilation system of claim 24, wherein the sensor has a location selected from the group consisting of the following locations: inside a compartment, inside the exhaust channel, near an air inlet and near an intake port.

27. The ventilation system of claim 24, wherein the system includes only a single exhaust channel.

28. The ventilation system of claim 23, wherein the system includes only a single exhaust port.

29. The ventilation system of claim 23, wherein the system includes only a single blower.

30. The ventilation system of claim 23, wherein the blower is configured to operate at a selected one of a plurality of blower speeds, and wherein the system further comprises a sensor and a processor for monitoring a condition of the laser device and controlling the blower speed based on a value of the monitored condition.

31. The ventilation system of claim 23, further comprising an aperture component for allowing exhaust to flow at a selected one or a plurality of exhaust flow rates, and a sensor and a processor for monitoring a condition of the laser device and controlling the aperture component based on a value of the monitored condition.

32. The ventilation system of claim 23, further comprising an additional blower.

33. The ventilation system of claim 23, wherein the system includes only a single exhaust channel.

* * * * *